US008607149B2

(12) United States Patent
Hintermeister et al.

(10) Patent No.: US 8,607,149 B2
(45) Date of Patent: Dec. 10, 2013

(54) HIGHLIGHTING RELATED USER INTERFACE CONTROLS

(75) Inventors: Gregory Richard Hintermeister, Rochester, MN (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1826 days.

(21) Appl. No.: 11/388,014

(22) Filed: Mar. 23, 2006

(65) Prior Publication Data

US 2007/0226650 A1   Sep. 27, 2007

(51) Int. Cl.
*G06F 3/048* (2006.01)

(52) U.S. Cl.
USPC ........... 715/767; 715/731; 715/853; 715/857; 715/854; 715/858; 715/825; 715/826; 715/733; 715/783; 715/835

(58) Field of Classification Search
USPC ......... 715/821, 731, 853, 857, 854, 858, 825, 715/826, 733, 835, 767
See application file for complete search history.

(56) References Cited

U.S. PATENT DOCUMENTS

| | | | | | |
|---|---|---|---|---|---|
| 5,040,131 | A | * | 8/1991 | Torres | 715/810 |
| 5,243,697 | A | | 9/1993 | Hoeber et al. | |
| 5,539,479 | A | * | 7/1996 | Bertram | 725/37 |
| 5,541,656 | A | * | 7/1996 | Kare et al. | 348/333.02 |
| 5,564,004 | A | * | 10/1996 | Grossman et al. | 715/835 |
| 5,574,843 | A | * | 11/1996 | Gerlach, Jr. | 345/418 |
| 5,754,179 | A | * | 5/1998 | Hocker et al. | 715/835 |
| 5,844,572 | A | * | 12/1998 | Schott | 345/440 |
| 5,920,313 | A | * | 7/1999 | Diedrichsen et al. | 715/767 |
| 6,137,487 | A | * | 10/2000 | Mantha | 715/767 |
| 6,151,017 | A | * | 11/2000 | Suzuoka et al. | 715/201 |
| 6,177,931 | B1 | * | 1/2001 | Alexander et al. | 725/52 |
| 6,177,941 | B1 | | 1/2001 | Haynes et al. | |
| 6,188,648 | B1 | * | 2/2001 | Olsen | 368/281 |
| 6,362,851 | B1 | * | 3/2002 | Lavelle et al. | 348/333.01 |
| 6,429,772 | B1 | * | 8/2002 | Lizzi | 340/7.55 |
| 6,462,757 | B1 | * | 10/2002 | Kao et al. | 715/783 |
| 6,469,722 | B1 | * | 10/2002 | Kinoe et al. | 715/837 |

(Continued)

FOREIGN PATENT DOCUMENTS

EP   747804 A1 * 12/1996
WO   WO 2005/045700 A1   5/2005

OTHER PUBLICATIONS ask-search-q=highlight+related+controls&qsrc=0&o=0&.*
ask-search-qsrc=1 &o=0&l=dir&q=highlight+related+ico.*

(Continued)

*Primary Examiner* — Boris Pesin
*Assistant Examiner* — John Heffington
(74) *Attorney, Agent, or Firm* — Martin & Associates, LLC; Bret J. Petersen (57) ABSTRACT

An apparatus and method is described for highlighting related user interface controls to selected items in order to improve the ease of use and the intuitiveness of a graphical user interface. In preferred embodiments, user interface controls that are related to a selected object in the display are uniquely highlighted when an object is selected to show the user what user interface options are related to or available to perform some action on the selected object. The preferred embodiments of related highlighted controls can be used in conjunction with prior art highlighted controls that show what actions are available to the user for the current environment or cursor location.

3 Claims, 8 Drawing Sheets

(56) References Cited

U.S. PATENT DOCUMENTS

| | | | |
|---|---|---|---|
| 6,484,189 B1* | 11/2002 | Gerlach et al. | 715/201 |
| 6,714,214 B1 | 3/2004 | DeMello et al. | |
| 6,756,997 B1* | 6/2004 | Ward et al. | 715/716 |
| 6,848,077 B1 | 1/2005 | McBrearty et al. | |
| 6,899,539 B1* | 5/2005 | Stallman et al. | 434/11 |
| 6,902,461 B1* | 6/2005 | Munch et al. | 446/91 |
| 6,939,192 B1* | 9/2005 | Munch et al. | 446/91 |
| 6,988,241 B1* | 1/2006 | Guttman et al. | 715/220 |
| 7,266,833 B2* | 9/2007 | Ward et al. | 725/42 |
| 7,328,450 B2* | 2/2008 | Macrae et al. | 725/42 |
| 7,475,363 B1* | 1/2009 | Yehuda et al. | 715/853 |
| 7,707,126 B2* | 4/2010 | Klein et al. | 706/12 |
| 7,730,428 B1* | 6/2010 | Yehuda et al. | 715/853 |
| 7,800,615 B2* | 9/2010 | MacPherson | 345/440 |
| 7,941,818 B2* | 5/2011 | Ward et al. | 725/42 |
| 8,220,021 B1* | 7/2012 | Look et al. | 725/45 |
| 2002/0073424 A1* | 6/2002 | Ward et al. | 725/42 |
| 2002/0105549 A1* | 8/2002 | Yokota | 345/824 |
| 2003/0208756 A1* | 11/2003 | Macrae et al. | 725/34 |
| 2004/0034631 A1* | 2/2004 | Julliard et al. | 707/4 |
| 2004/0045025 A1* | 3/2004 | Ward et al. | 725/42 |
| 2004/0051741 A1* | 3/2004 | Venturino | 345/812 |
| 2004/0051803 A1* | 3/2004 | Venturino et al. | 348/333.02 |
| 2004/0051804 A1* | 3/2004 | Veturino et al. | 348/333.12 |
| 2004/0141012 A1* | 7/2004 | Tootill | 345/827 |
| 2005/0010949 A1* | 1/2005 | Ward et al. | 725/42 |
| 2005/0015254 A1 | 1/2005 | Beaman | |
| 2005/0223338 A1* | 10/2005 | Partanen | 715/821 |
| 2006/0036964 A1* | 2/2006 | Satterfield et al. | 715/777 |
| 2007/0016926 A1* | 1/2007 | Ward et al. | 725/42 |
| 2007/0033613 A1* | 2/2007 | Ward et al. | 725/42 |
| 2007/0171224 A1* | 7/2007 | MacPherson | 345/440 |
| 2007/0186240 A1* | 8/2007 | Ward et al. | 725/42 |
| 2007/0245300 A1* | 10/2007 | Chan et al. | 717/105 |
| 2008/0077958 A1* | 3/2008 | Ward et al. | 725/42 |
| 2008/0127265 A1* | 5/2008 | Ward et al. | 725/42 |
| 2008/0127266 A1* | 5/2008 | Ward et al. | 725/42 |
| 2011/0035770 A1* | 2/2011 | Ward et al. | 725/34 |
| 2011/0035771 A1* | 2/2011 | Ward et al. | 725/34 |
| 2011/0197231 A1* | 8/2011 | Ward et al. | 725/42 |

OTHER PUBLICATIONS

Becker, et al, "Cursor-Tracking Highlighter", IBM Technical Disclosure Bulletin, Oct. 1996, vol. 39, No. 10.

Banning, et al, "User Interface Shortcut", IBM Technical Disclosure Bulletin, Aug. 1990, vol. 33, No. 3A.

Berry, et al, "Contextual Help Facility for Interactive Systems", IBM Technical Disclosure Bulletin, Mar. 1985, vol. 27, No. 10B.

\* cited by examiner

HIGHLIGHTING RELATED USER INTERFACE CONTROLS

BACKGROUND OF THE INVENTION

1. Technical Field

This invention generally relates to computer displays and graphical user interfaces and more specifically relates to an apparatus and method for highlighting related user interface controls on a user interface.

2. Background Art

Computer systems use a variety of user interface methods to display information and to prompt input from a computer user. These interface methods are often referred to as a user interface. An important aspect of all computer systems is the ease of use and the intuitiveness of the user interface. Most popular computer systems today use a graphical user interface (GUI) on a computer display screen to interact with the computer's user. Many GUI's employ one or more windows that can be opened on the computer's display. A window is a division of a computer display screen, which can be opened, closed, and moved around on the screen by the computer user. A window often includes a menu bar that contains one or more selections available to the user and drop down menus that are activated when an item on the menu bar is selected.

In many GUI's for computer programs, there is a great deal of information, including menus, icons, buttons, and selection boxes displayed in the GUI window. In these complex computer programs, users are increasingly confronted with extremely sophisticated sequences of possible steps that can be selected. Thus, it becomes confusing for the user to readily understand what actions are appropriate at any given time. And even in less complex situations, it is advantageous for the new user to be shown what options are available to make using the software intuitive. Some GUI's change the appearance of tool bars and menu buttons depending on the state of the current operation, the location of the cursor, and the items selected. However, when a computer user selects an item in a computer window in prior art GUIs, it is not readily apparent to the user what actions or user interface options are related to the selected object or available to perform some action on the selected object. Further, when controls are highlighted in the prior art depending on the selected object, they have the same highlighting as other controls that are currently available.

It would be advantageous for a GUI to give more guidance to the user on what options are related to a selected object or will affect a selected object. Without a simpler and more intuitive way to assist computer users to navigate through a user interface, the computer industry will continue to unnecessarily burden the computer users with the complexity of choices available in computer software user interfaces.

BRIEF SUMMARY OF THE INVENTION

According to the preferred embodiments, an apparatus and method is described for highlighting related user interface controls to selected items in order to improve the ease of use and the intuitiveness of a graphical user interface. In preferred embodiments, user interface controls that are specifically related to a selected object in the display are uniquely highlighted when an object is selected to show the user what user interface options are related to or available to perform some action on the selected object. The preferred embodiments of related highlighted controls can be used in conjunction with prior art highlighted controls that show what actions are available to the user for the current environment or cursor location.

While the preferred embodiments described herein are directed to user interfaces on a windows computer operating system and computer applications, the claimed embodiments herein expressly include other computer user interface applications and operating systems that employ a user interface, including those user interfaces that are used on handheld computers, phones, audio players, and personal digital assistants.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and.

DETAILED DESCRIPTION OF THE INVENTION

The present invention relates to an apparatus and method for highlighting related user interface controls to selected items. In preferred embodiments, user interface controls that are related to a selected object in the display are uniquely highlighted when an object is selected to show the user what user interface options are specifically related to or available to perform some action on the selected object. This brief description of window displays and prior art GUIs provides background information that will help the reader to understand the present invention.

1. Prior Art

Prior art Example of a Windows Type Graphical User Interface

Figure 1:
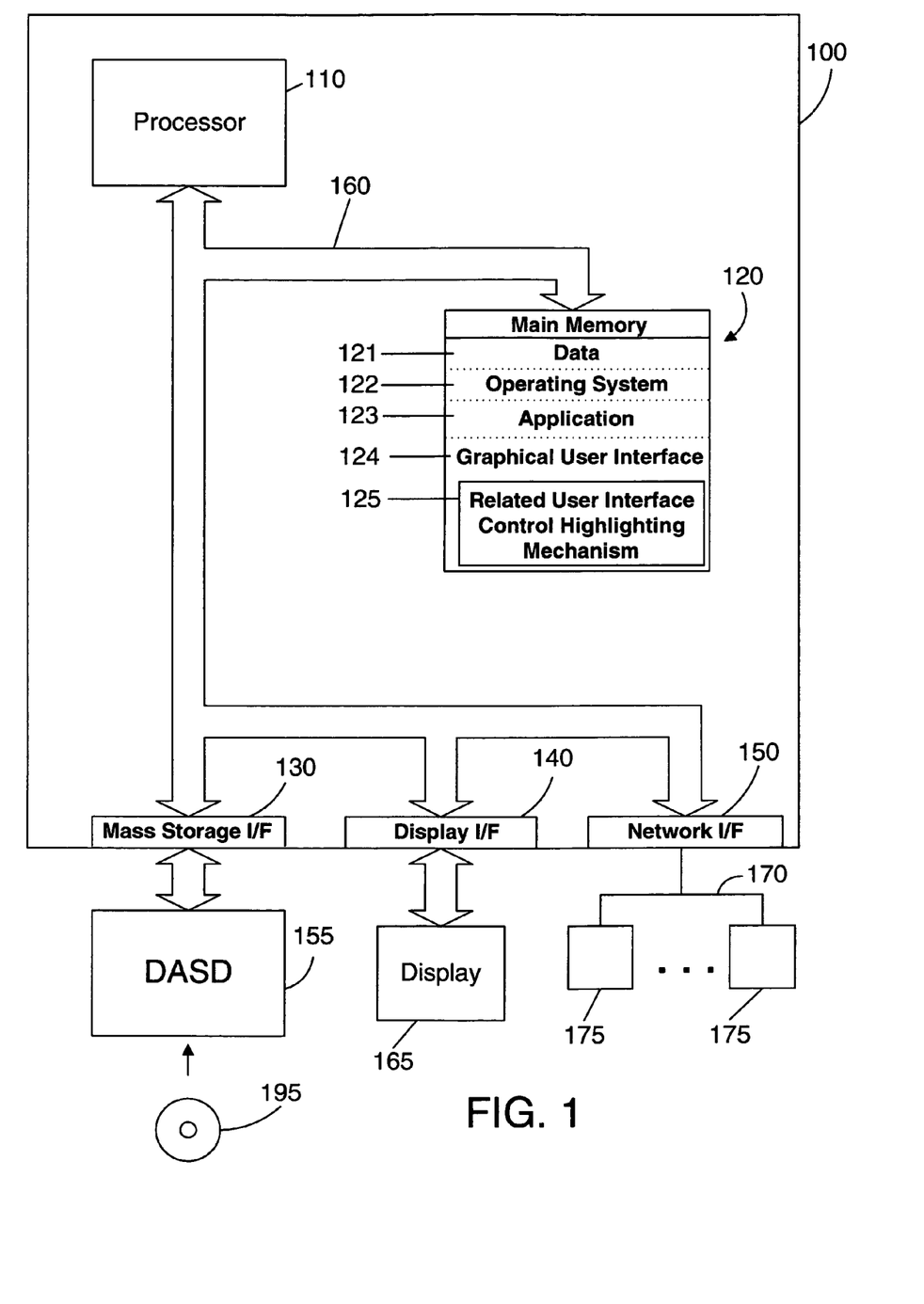
FIG. 1 is a block diagram of a computer apparatus in accordance with a preferred embodiment of the present invention.
Figure 2:
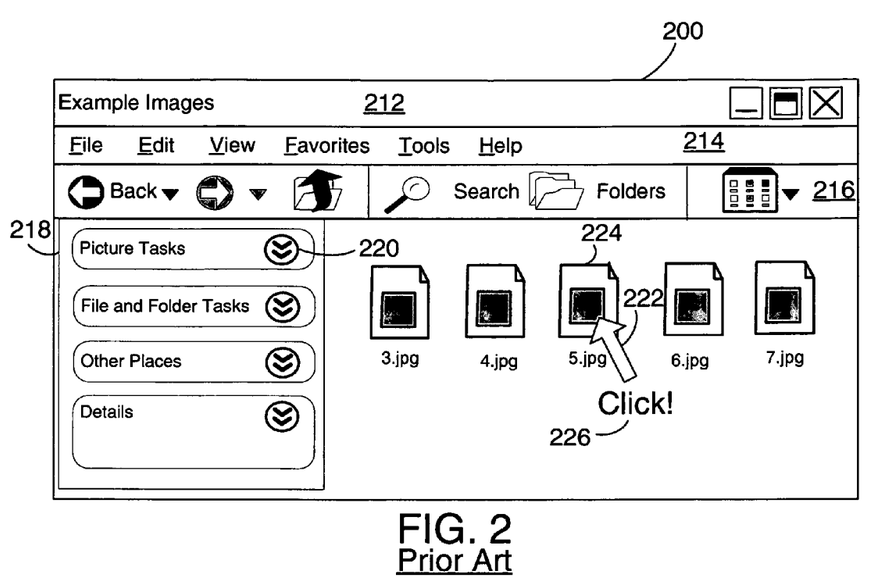
FIG. 2 represents a windows application with a graphical user interface to illustrate an example according to the prior art.

FIG. 2 shows a windows screen 200 for a generic application program such as a document manager as it would be observed by a computer user on a video display (display 165 in FIG. 1). The window screen incorporates a graphical user interface (GUI) according to the prior art. The GUI in the window screen 200 includes title bar 212 and a menu bar 214, each with a standard set of commands. The GUI 210 also includes a toolbar 216. A tool bar may have various tools to control objects (e.g., text, charts and graphics) within the window or to control the window. Toolbars can be provided as rows or columns, and have several buttons comprising textual icons, non-textual (graphic) icons, or icons having both graphic and textual elements. The depicted toolbar 216 includes, for example, common buttons to move back to the previous display, the next display, move up one folder level, search, etc. FIG. 2 also includes a windows tool bar 218. This tool bar has drop down menus for various window functions as indicated by the arrow circle 220. Each of these menus and buttons can be selected using the graphical pointer or cursor 222 controlled by a pointing device such as a mouse (not shown).

Figure 3:
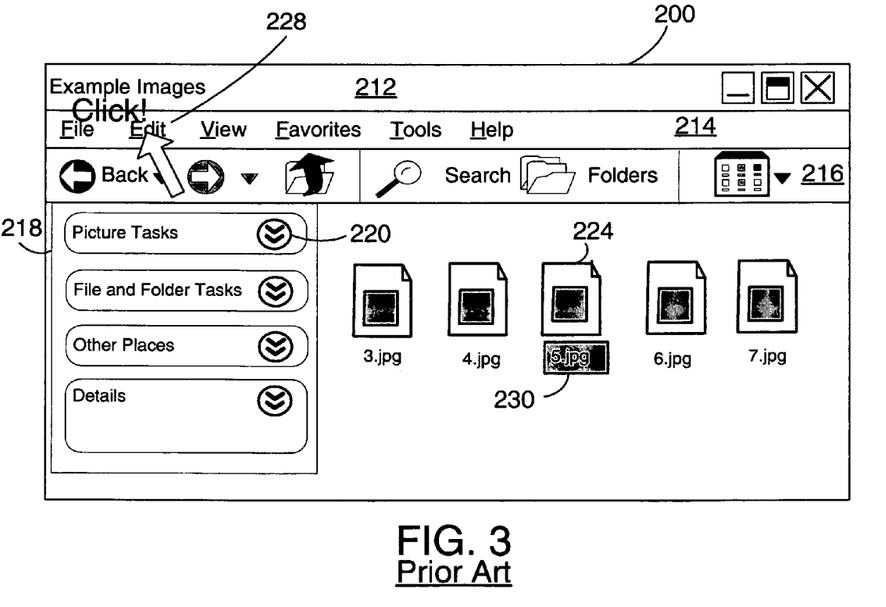
FIG. 3 represents a windows application with a graphical user interface to illustrate an example according to the prior art.
Figure 4:
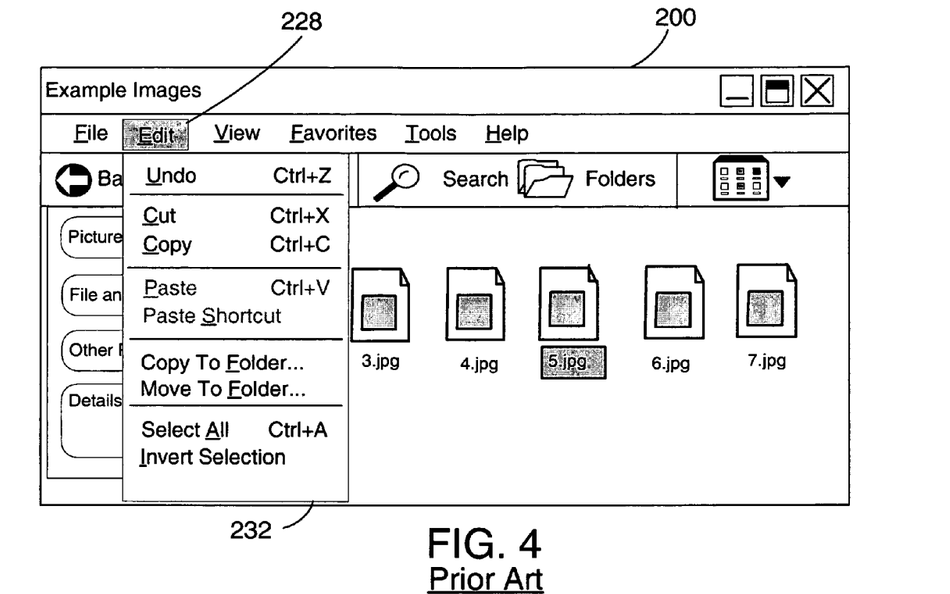
FIG. 4 represents a windows application with a graphical user interface to illustrate an example according to the prior art.

FIGS. 2-4 illustrate how a typical prior art GUI gives clues to the user about what tools or buttons can be used or are active as described in the background above. FIG. 2 shows the cursor 220 placed over an object 224 on the GUI 210. When the mouse button is pressed (represented by the "Click!" text 226 in FIG. 2), the text 230 below the object 224 is highlighted as shown in FIG. 3. When the user then selects the "Edit" menu item 228 as shown in FIG. 3, the window screen 210 would then appear as shown in FIG. 4. The edit menu item 228 is now shown highlighted to indicate the state of the menu as shown in FIG. 4. In addition, the "Edit" drop down menu 232 is displayed in response to the selection of the "Edit" menu item 228. The drop down menu 232 shows a number of menu choices that is typical in the prior art. Some of the menu items appear in dark type and other appear in a shadow or ghost type. The menu items that appear in a shadow type are those that are not currently available. In this way, the prior art GUI is able to show the user what features are available and what features are not available. Menu highlighting in the prior art shows the availability of all the features. The availability depends on the state of the window in general and on what object or objects 224 are currently selected. The menu highlighting does not indicate to the user what menu items are only usable with the selected object(s).

2. Detailed Description

An apparatus and method is described herein for highlighting GUI controls and buttons to give the user clues how to proceed with input. In preferred embodiments, GUI controls are highlighted based specifically on the selected object as described further below. GUI controls that are highlighted in response to the selected object include menu items, tool bar and tool box buttons, browser page objects and browser page buttons, Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, an operating system 122, an application program 123, and a graphical user interface 124. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. The application 123 can be any software application. The graphical user interface 124 can be part of the operating system 122 or part of the application program 123. In preferred embodiments, the graphical user interface includes a related user interface control highlighting mechanism 125 as described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, application 123, and the graphical user interface 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

Figure 5:
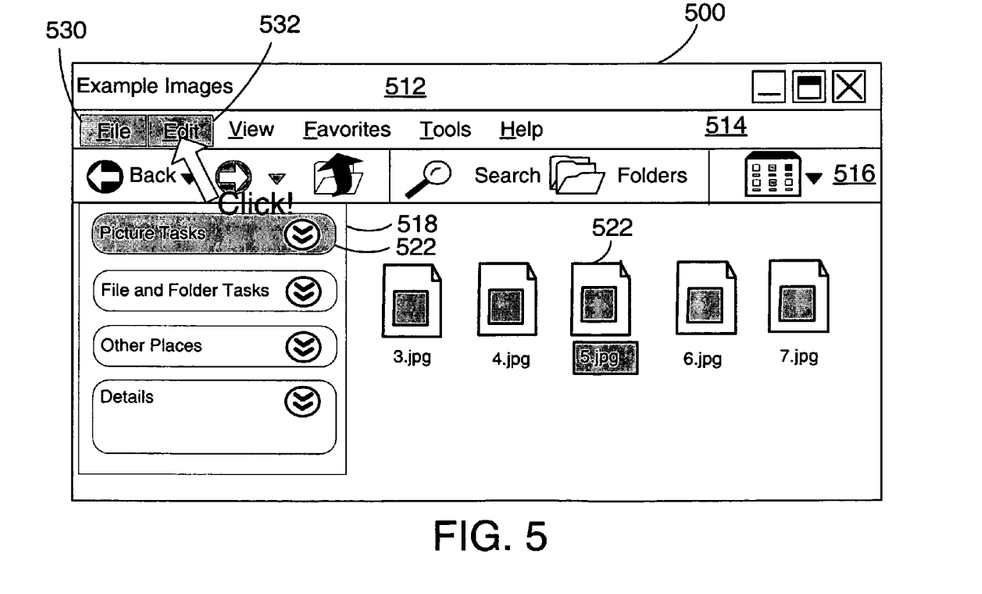
FIG. 5 represents a windows application with a graphical user interface illustrating highlighted menu items that contain drop down menu actions that can be activated for the selected item according to preferred embodiments.

FIG. 5 illustrates a windows screen 500 of a document manager program according to a preferred embodiment. The window screen 500 includes a graphical user interface (GUI) that highlights related user interface controls based on the object that is currently selected by means of a related user interface control highlighting mechanism 125 (FIG. 1). In the illustrated example of FIG. 5, the object selected is a picture file 522 stored in a computer resource such as a computer disk drive or network disk drive and represented on the screen by an icon. When the icon of object 522 is selected the icon is highlighted to reflect that it is a selected object on the screen. Window screen 500 illustrates how the window screen would appear after the picture file 222 is selected as described above with reference to FIG. 2. Thus, window screen 500 represents the state of window screen shown in the prior art of FIG. 3, and window screen 500 according to preferred embodiments can be compared to the prior art screen shown in FIG. 3. As can be seen in FIG. 5, the menu bar 514 has highlighted controls 530, 532. The "file" button 530, and the "edit" button 532 are uniquely highlighted by bold text in FIG. 5 to indicate to the user that the underlying drop down menus contain related user interface controls to the selected object 522 on the screen according to preferred embodiments herein. The user interface controls are uniquely highlighted, meaning they are highlighted in a manner that distinguishes interface controls that are specifically related to the selected object(s) from those interface controls that are available depending on the context.

Again referring to FIG. 5, another embodiment is also illustrated. In the window task bar 518 the "Picture Tasks" button 533 is highlighted to show that the picture tasks button 533 has one or more menu items that are related to the selected object 522. In this embodiment, the type of the object is important in the determination of the relationship between the object and the highlighted GUI control. As can be seen in FIG. 5, the selected object 522 is a graphic file indicated by the .jpg file extension. Thus the related widows tasks are those that operate on graphic files, so the picture tasks button 518 is highlighted. In this embodiment a single aspect of the selected object, the file extension, is used to identify a specific class of user interface controls, those that are related to the file extension of the selected object.

Figure 6:
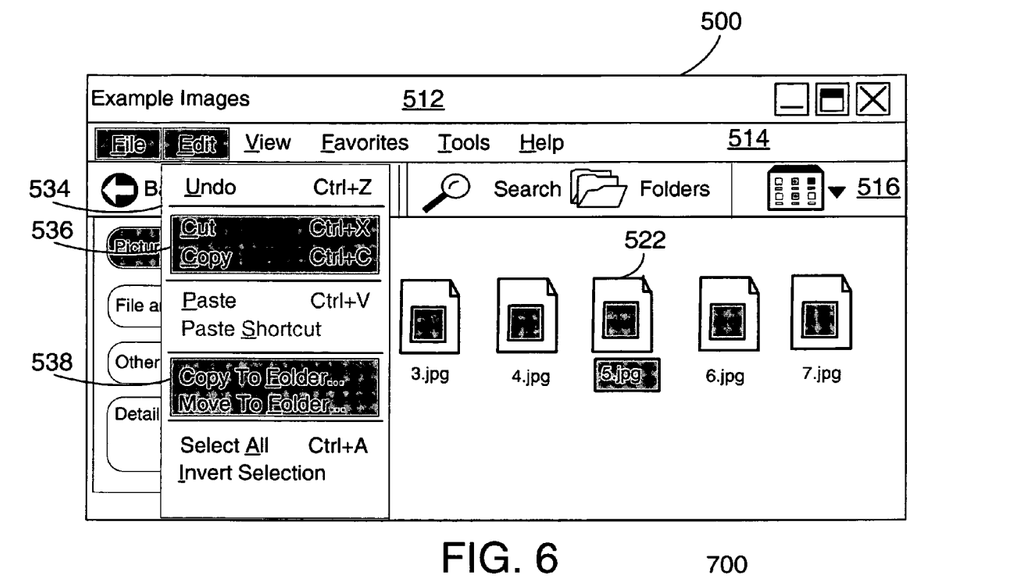
FIG. 6 represents the windows application in the example shown in FIG. 5 with a drop down menu showing highlighted actions that can be activated for the selected item according to preferred embodiments.

FIG. 6 illustrates another view of windows screen 500 of the document manager program shown in FIG. 5 according to another preferred embodiment. In FIG. 6, window screen 500 illustrates how the window screen would appear after the "edit" button 532 in FIG. 5 is selected to display the drop down menu 534. Thus, window screen 500 in FIG. 6 according to preferred embodiments can be compared to the prior art screen 200 shown in FIG. 4. In contrast to the prior art shown in FIG. 4, the drop down menu 534 in FIG. 6 has highlighted controls 536, 538. The "cut" and "copy" buttons 536, and the "copy to folder" and "move to folder" buttons 538 are highlighted to indicate to the user that these menu items are directly related user interface controls to the selected object 522 on the screen. The other buttons on the drop down menu 534 may be displayed in bold or in shadow to show which menu items are available or not available respectively as is known in the prior art. In this embodiment, related user interface controls means that the highlighted controls will activate menu selections that perform a task using the selected object 522 or act on the selected object 522.

Figure 7:
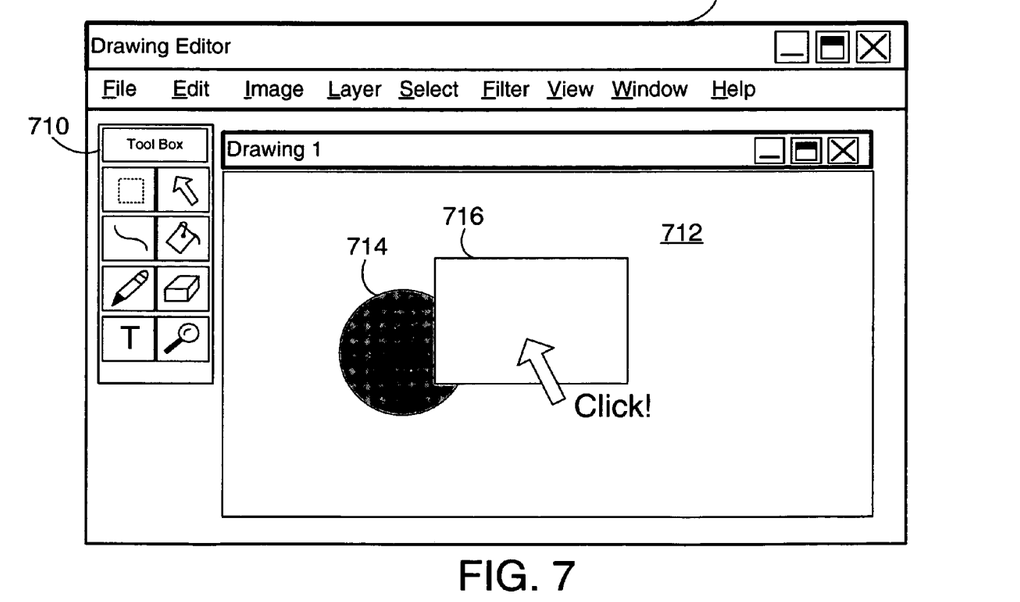
FIG. 7 represents a drawing editor application with a graphical user interface illustrating an example according to preferred embodiments.
Figure 8:
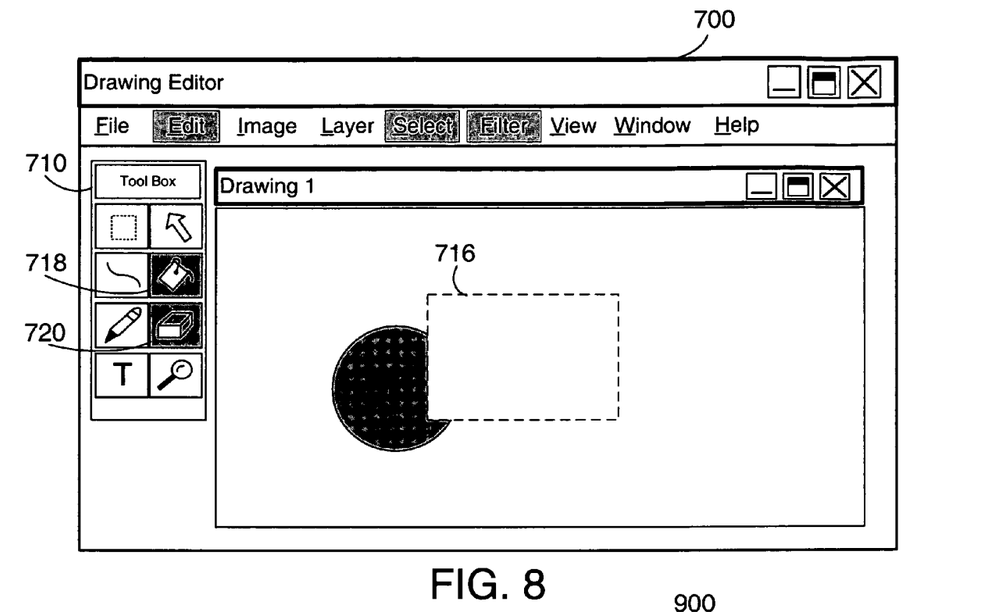
FIG. 8 represents the drawing editor application in the example shown in FIG. 7 with highlighted tool bar and tool box buttons that can be used with the selected item according to preferred embodiments.

FIG. 7 shows a windows screen 700 of a drawing editor program to illustrate an example of another preferred embodiment. The window screen 700 provides a graphical user interface (GUI) that highlights related user interface controls in a tool box 710 based on the object that is currently selected in a sub-window 712 of the windows screen 700. In the illustrated example of FIG. 7, the sub-window screen 712 includes two drawing objects, a circle 714 and a rectangle 716. FIG. 8 illustrates another view of windows screen 500 of the drawing editor program shown in FIG. 6 according to a preferred embodiment. FIG. 8 illustrates how the window screen 700 would appear after the rectangle 716 in FIG. 7 is selected. In FIG. 8, the tool box 710 has highlighted controls 718 and 720. The "fill" button 718, and the "eraser" button 720 are highlighted to indicate to the user that these menu items are related user interface controls to the selected object 716 (rectangle) on the sub-menu screen 712. The highlighted menu items indicated to the user that these user interface controls are related to the selected object to assist the user to quickly see what options are available in conjunction with the selected objects or that will act upon the selected objects.

Figure 9:
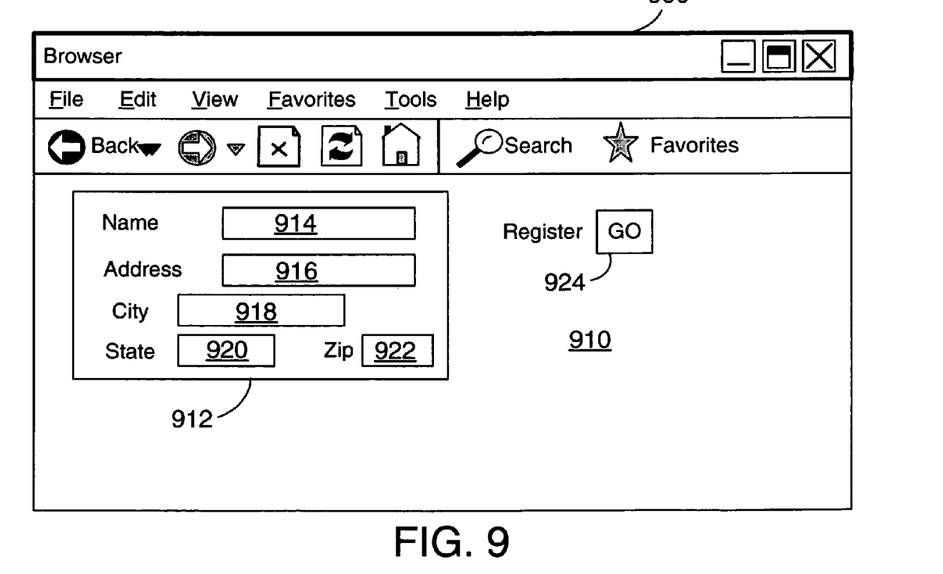
FIGS. 9 illustrates an example of a browser application with a graphical user interface according to the prior art.

FIG. 9 shows a windows screen 900 of a browser program to illustrate an example of another preferred embodiment. The window screen 900 provides a graphical user interface (GUI) that highlights related user interface controls in a browser window screen 900 or browser web page 910 based on the object that is currently selected in the web page 910. In the illustrated example of FIG. 9, the web page 910 includes a user input box 912 with several fields 914, 916, 918, 920 and 922 to input user information, and a "Go" button 924 to initiate a registration process using the user information in the user input box 912. The changes that occur to FIG. 9 according to a preferred embodiment are described with reference to FIG. 10.

Figure 10:
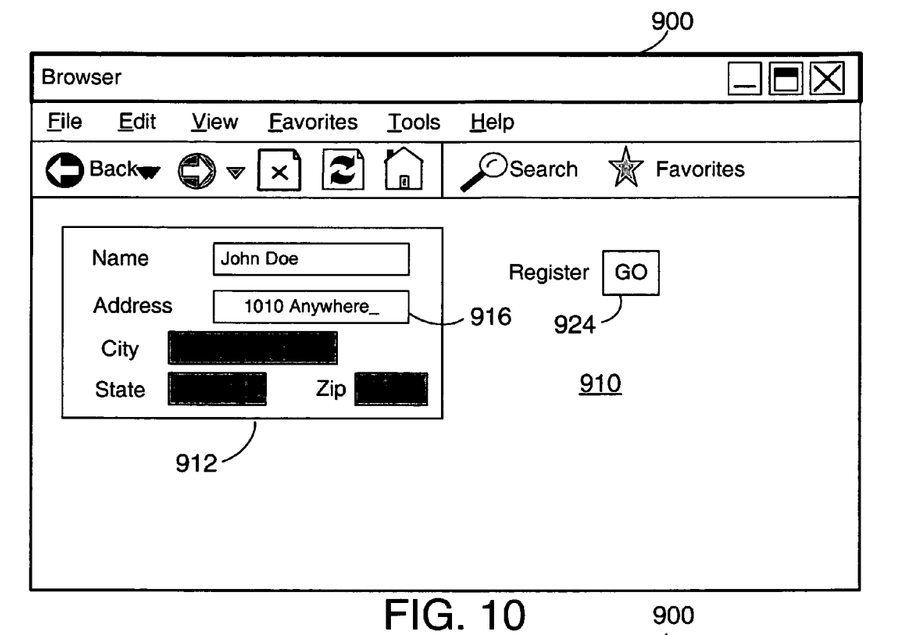
FIG. 10 illustrates the browser application in the example shown in FIG. 9 with highlighted fields that are related to the selected item according to preferred embodiments.

FIG. 10 illustrates another view of windows screen 900 of the browser program shown in FIG. 9 according to a preferred embodiment. FIG. 10 illustrates how the window screen 900 would appear while the user is in the process of filling in requested information in the user input box 912. In FIG. 10, the user has already input "John Doe" in the name field 914 and the address "1010 Anywhere" in the address field 916. The cursor underline character after the text (1010 Anywhere_) in the address field 916 indicates that the cursor is in the address field and the address field is "selected", meaning it is the current active field in the display. According to a preferred embodiment, the related user interface controls in the browser window 910 are highlighted based on the object that is currently selected in the browser window. In this example, the selected object is the address field 916, and the highlighted user interface controls are the city field 918, the state field 920 and the zip code field 922.

Figure 11:
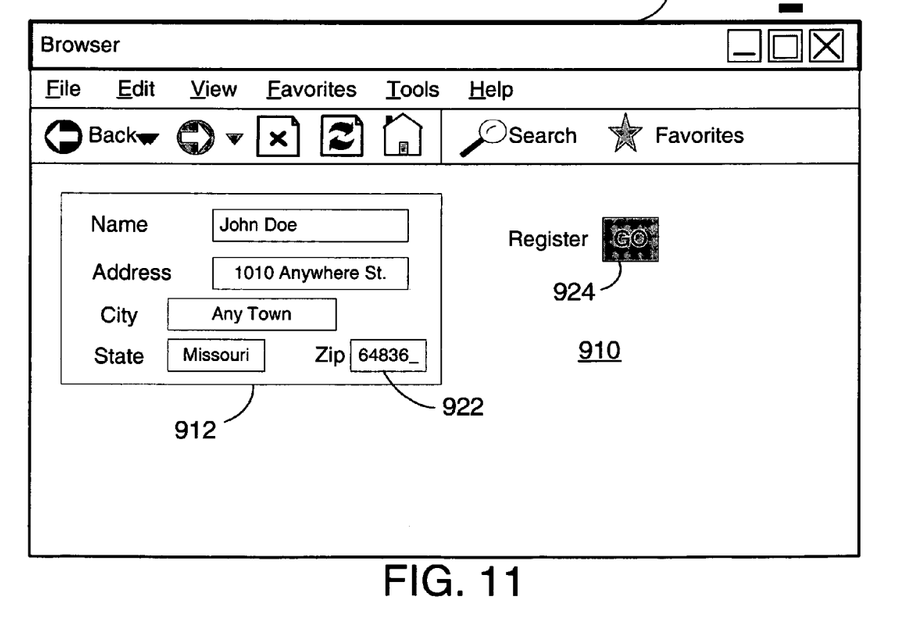
FIG. 11 again illustrates the browser application in the example shown in FIG. 9 with a highlighted button to show the user how to continue with the selected item.

FIG. 11 illustrates another view of windows screen 900 of the browser program shown in FIG. 9 according to another preferred embodiment. FIG. 11 illustrates how the window screen 900 would appear when the user completes the process of filling in requested information in the user input box 912. In FIG. 11, the user has just completed input to each of the fields in the user input box 912. The cursor underline character after the text (64386_) in the zip code field 922 indicates that the cursor is in the zip code field 922. Since the zip code field is the last field in the user input box 912, the user can now be prompted what user interface controls are available or will act on the selected and completed input box 912. According to a preferred embodiment, the related user interface controls in the browser window 900 are highlighted based on the currently selected object in the browser window being a completed input field. In this example, the selected object is the zip code 922 of the user input box 912 and the highlighted interface control is the "Go" button 924.

Figure 12:
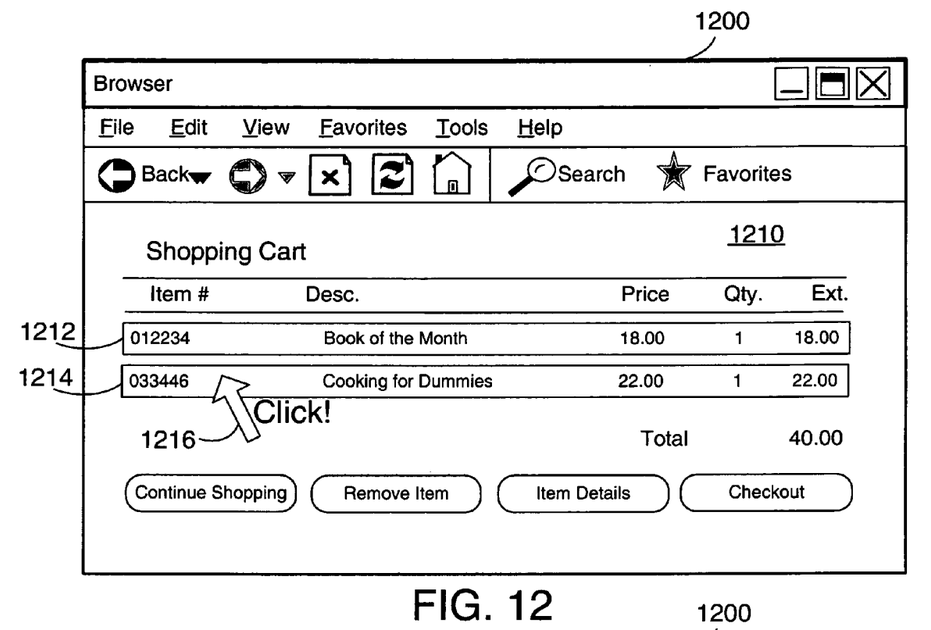
FIG. 12 illustrates another example of a browser application with a graphical user interface according to the prior art.
Figure 13:
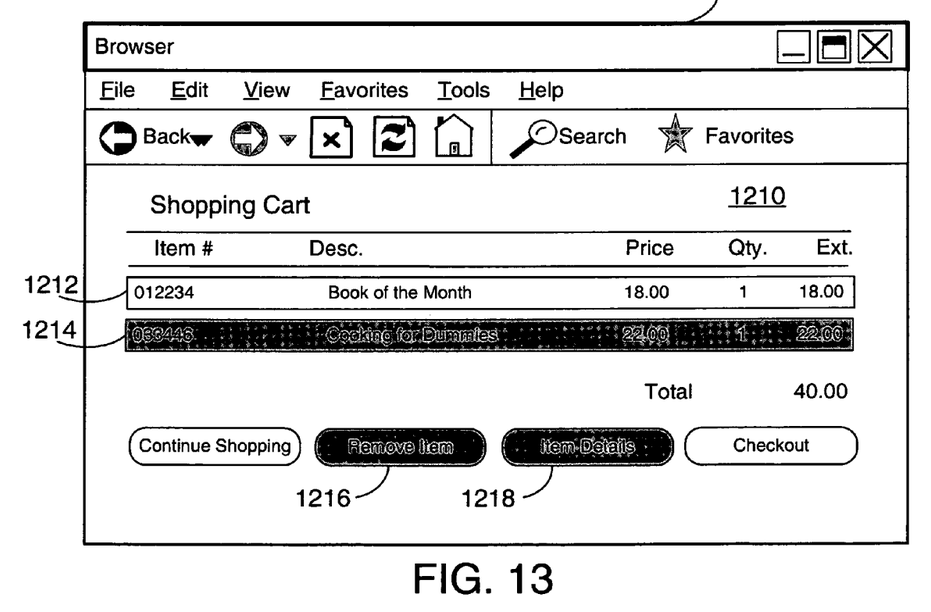
FIG. 13 illustrates the browser application in the example shown in FIG. 12 with highlighted fields that are related to the selected item according to preferred embodiments.

FIG. 12 shows another windows screen 1200 of a browser program to illustrate an example of another preferred embodiment. In the illustrated example of FIG. 12, the web page 1210 includes a "shopping cart" type web page that is in common use on the internet. The shopping cart allows a user to select items from a vendor's web pages for purchase. In the example of FIG. 12, the user has selected two items for purchase 1212, and 1214. The cursor 1216 with the "Click" text 1216 indicates that the user is selecting the item 1214. FIG. 13 illustrates the changes that occur to FIG. 12 when the user selects item 1214 according to a preferred embodiment. As shown in FIG. 13, selected status of item 1214 is indicated by highlighting the item 1214 in a manner know in the prior art. According to a preferred embodiment, the related user interface controls in the browser window 1212 are highlighted based on the object that is currently selected in the browser window. In this example, the selected object is the item 1214, and the highlighted user interface controls are the remove item button 1216 and the item details button 1218.

In the above described embodiments, the related control was "highlighted" by showing the control darkened on the screen. Other embodiments herein include how the highlighting could be visually represented on the screen. The highlighting could include any other appropriate representation such as using different colors, blinking, border treatment, reverse video etc. In addition, different highlighting could be used for different purposes. For example, a red color could be used for destructive actions such as delete or cut, and a green color could be used for less destructive actions such as copy and paste. In another embodiment, the color could be used to indicate what role a person must be enrolled to use the action, such as red for a security officer, and green for an administrator. In this way the different highlighting can emphasize different criteria for the related controls or different characteristics of the related controls. The different criteria of the related controls offers information to the user about the different types of controls available to use with the selected object or operate on the selected object.

Figure 14:
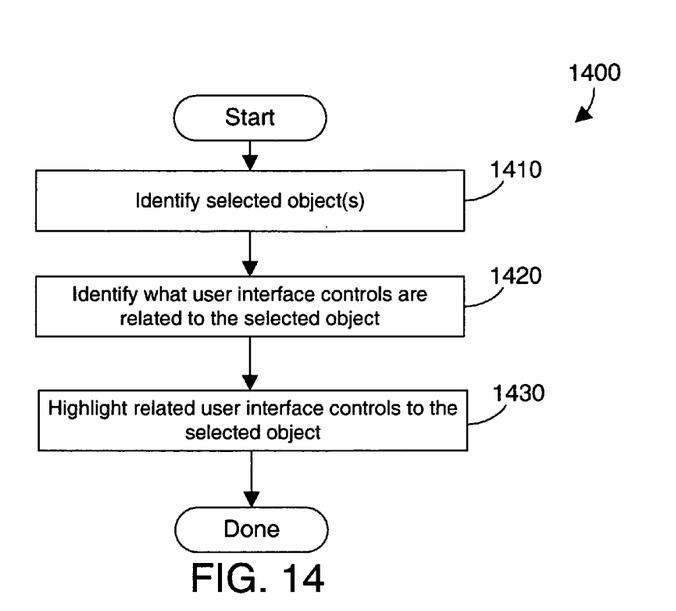
FIG. 14 illustrates a method for highlighting related user interface controls according to preferred embodiments.

Referring now to FIG. 14 a method 1400 is shown according to preferred embodiments herein. Method 1400 illustrates the steps performed by the related user interface control highlighting mechanism 125 shown in FIG. 1 that highlights related user interface controls based on a selected item according to preferred embodiments. The method first identifies a selected object and the type of selected object (step 1410). Then the interface controls that are related to the selected object and/or the type of selected object are identified (step 1430). The interface controls that are related to the selected object are then highlighted in some manner (step 1430) and the method is done.

It is known in the prior art to navigate GUI controls such as a menu bar or browser page menu controls with the keyboard. This is sometimes referred to as tab setting, because it is common to use the tab key along with the arrow keys to move between menu commands. Using the tab key is particularly common when moving between user interface controls within a browser page. In many software applications, this feature is available after pressing a control key to move the cursor to the menu bar. The arrow keys can then be used to sequentially move the cursor through the menu bar options.

Figure 15:
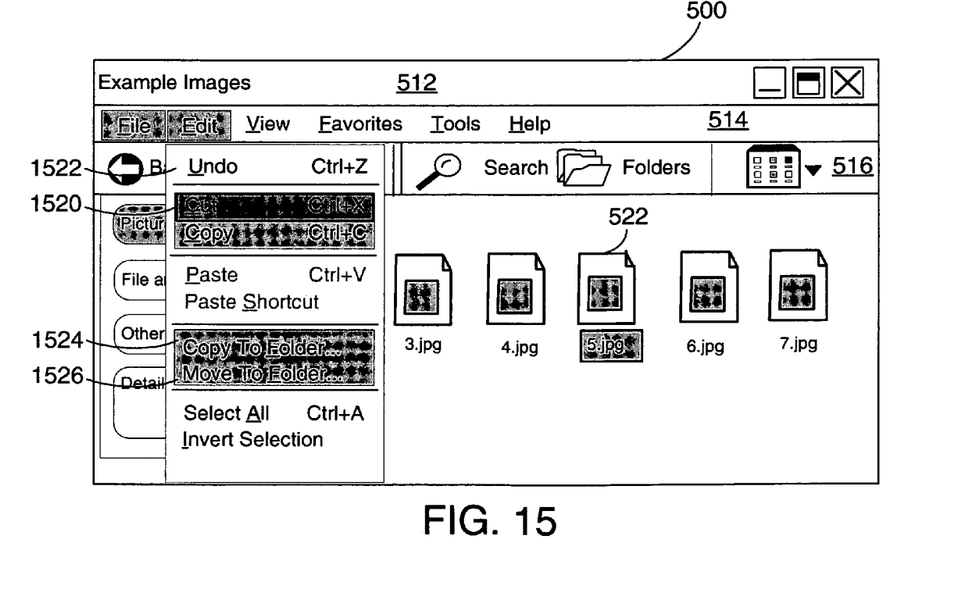
FIG. 15 illustrates represents a windows application with a graphical user interface to illustrate a subsetted tab feature according to preferred embodiments.

In contrast, in preferred embodiments, a subsetted tab order is used to navigate only the GUI menu elements that are uniquely highlighted as described above. In preferred embodiments, a subsetted tab order is activated with a special key stroke such that the keyboard can navigate the user interface controls as described above but the navigation is limited to the subset of uniquely highlighted controls. The special key stroke to activate the subsetted tab order could be the combination of "ctrl" and "Alt" and "tab." FIG. 15 shows an example of subsetted tab order according to preferred embodiments with reference to FIG. 6. FIG. 6 represents the screen after the user activates the subsetted tab order with a special key stroke and moves the cursor to the "Edit" menu option. When the user then presses the down arrow key, the cursor will move to the "cut" menu option 1520 and will skip the "undo" menu option 1522 because the "undo" menu option 1522 it is not uniquely highlighted. Similarly, using the arrow keys will navigate through the menu to only those items that are uniquely highlighted. For example, again pressing the down arrow would move the cursor (not shown) to the "copy to Folder" menu option 1524 and then to the "move to folder" menu option 1526.

An apparatus and method has been described for highlighting related user interface controls to objects that are currently selected on the display screen to show the user what actions or menu options are available to perform some action on the selected object or related to the selected object. The described embodiments improve the ease of use and the intuitiveness of a graphical user interface by reducing the complexity of choices available and assisting a computer user to efficiently navigate through the GUI.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A method for highlighting related user interface controls in a computer apparatus, the method comprising the steps of:
    (A) identifying an object selected by a user;
    (B) identifying which user interface control buttons are related to the selected object and are available to perform some action on the selected object;
    (C) uniquely highlighting only those user interface control buttons that are related to the selected object and are currently available to perform some action on the selected object;
    (D) navigating through user interface controls using keyboard keys, where the sequence of the user interface controls navigated is limited to uniquely highlighted menu controls; and
    wherein the user interface control buttons are chosen from the following: a menu button, a drop down menu button, a toolbar button, a windows toolbar button, a input field in an internet page displayed on a browser, and a button in an internet page displayed on a browser.

2. A method for highlighting related user interface controls in a computer apparatus, the method comprising the steps of:
    (A) identifying an object selected by a user;
    (B) identifying which user interface control buttons are related to the selected object and are available to perform some action on the selected object;
    (C) uniquely highlighting only those user interface control buttons that are related to the selected object and are currently available to perform some action on the selected object;
    wherein the user interface control buttons are chosen from the following: a menu button, a drop down menu button, a toolbar button, a windows toolbar button, a input field in an internet page displayed on a browser, and a button in an internet page displayed on a browser and
    wherein a drop down menu button is highlighted when a menu option in the drop down menu that is not displayed is available to perform some action on the selected object.

3. A method for highlighting related user interface controls in a computer apparatus, the method comprising the steps of:
    (A) identifying an object selected by a user in an application program;
    (B) identifying user interface control buttons of the application program that are related to the selected object within the application program and available to perform some action on the selected object;
    (C) uniquely highlighting only those user interface control buttons that are related to the selected object and are currently available to perform some action on the selected object; and
    (D) navigating through user interface controls using keyboard keys, where the sequence of the user interface controls navigated is limited to uniquely highlighted menu controls.

* * * * *